United States Patent [19]

Marvin

[11] 4,166,791

[45] Sep. 4, 1979

[54] SEWAGE GAS COLLECTION RESERVOIR

[76] Inventor: Mark C. Marvin, 25 Floral Rd., Peekskill, N.Y. 10566

[21] Appl. No.: 821,798

[22] Filed: Aug. 4, 1977

[51] Int. Cl.$^2$ ............................................. C02C 1/14
[52] U.S. Cl. ..................... 210/120; 137/202; 210/180; 210/188; 210/136
[58] Field of Search ............ 23/290.5; 48/111, 197 A; 55/387; 137/202, 205; 210/2, 119, 136, 180, 187, 188, 120

[56] References Cited

U.S. PATENT DOCUMENTS

| 1,717,100 | 6/1929 | Downes | 210/180 X |
| 2,541,630 | 2/1951 | Yeomans | 210/2 X |
| 3,338,826 | 8/1967 | Kramer | 210/180 X |
| 3,340,887 | 9/1967 | Peters | 137/202 |
| 3,383,309 | 5/1968 | Chandler | 210/180 X |
| 3,435,841 | 4/1969 | Williams et al. | 137/205 X |
| 3,788,047 | 1/1974 | Douthitt | 55/387 |
| 3,933,628 | 1/1976 | Varani | 210/187 X |
| 3,981,803 | 9/1976 | Coulthard | 210/180 X |
| 4,050,907 | 9/1977 | Brimhall | 48/197 A X |

OTHER PUBLICATIONS

Bloodgood, *Gas from Sewage Sludge*, Water & Sewage Works, 11/1954, pp. 512–514.

*Primary Examiner*—Robert H. Spitzer

[57] ABSTRACT

A sewage gas collection reservoir is provided with a valve and distribution system. Combustible gases are produced by anaerobic bacteria in mixtures of organic matter which are trapped by the cone shaped reservoir at the top of the mixture from which the gas is drawn past a valve, then past a water trap, then past an activated charcoal filter and fed into an ordinary household gas line by the vacuum created by the flow of the household gas supply. A one way valve is provided at the activated charcoal filter to prevent a reverse flow into the system and reservoir.

3 Claims, 4 Drawing Figures

SEWAGE GAS COLLECTION RESERVOIR

This present invention relates to fluid displacement gas collecting devices ordinarily used in the laboratory to collect gas from a chemical reaction. In this case, the general principal is applied to sewage systems in which anaerobic bacteria produce the combustible gases, hydrogen and methane. No devices are presently available which trap these gases, and in particular, the homeowner is deprived of a steady and plentiful supply of these gases which have a ready application in home gas cooking and heating systems, if they can be trapped. The city of Boston, in fact, lights many of its streets with trapped sewer gas.

The principal object of this invention is to provide a means for trapping combustible gas that is generated in home sewage systems by the anaerobic bacteria that are ordinarily present in sewage and sludge mixtures.

Another object of the invention is to provide a system for drawing off the trapped gas so that it can be fed into household natural gas supply systems to be used as a mixture of, or extension from household gas, but in the same manner that household gas is used. It is necessary that appropriate one-way valves be installed in the system to prevent the loss of outside provided gas into the collection system due to the pressure of the outside supplied gas.

A further object of the invention is to provide a purification system that will remove the natural odor of the home generated gas, as well as any bacterial contamination before such gas can reach the inhabited areas of the residence.

Another object of the invention is to provide a simple, reliable, and low cost means of providing energy through the use of resources which are usually disposed of.

Other objects and advantages of the invention will become better understood hereinafter from a consideration of the specification with reference to the accompanying drawings forming part thereof, and in which like numerals correspond to like parts throughout the several views of the invention and wherein.

Figure 1:
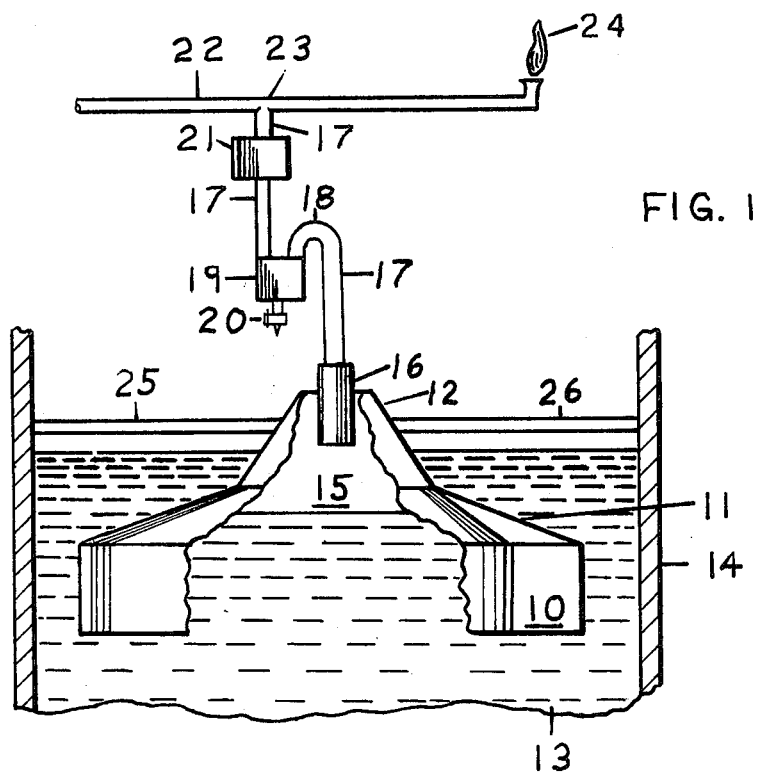
FIG. 1 is a side view of the cut-away of the sewage gas collection reservoir as it is installed in a sewage tank with the necessary tube system for conveying the gas.
Figure 2:
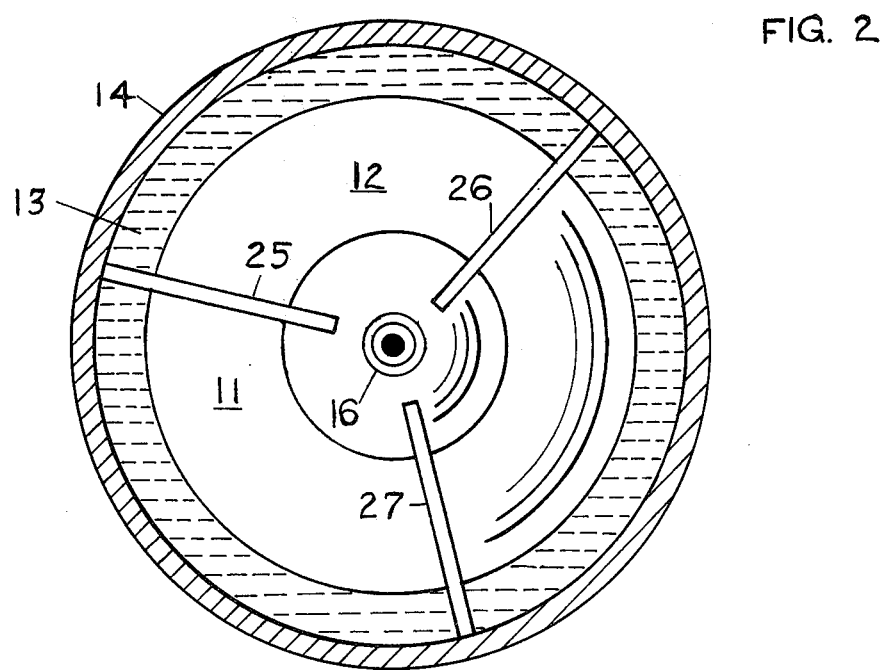
FIG. 2 is a top view of the reservoir in place, with the top of the sewage tank cut away to show the top surface of the apparatus.

Referring to the drawing, the Sewage Gas Collection Reservoir consists of the large cylindrical section 10, which forms the largest volume segment of the reservoir. To this is attached the larger conical reservoir 11, and to this is attached the smaller conical reservoir 12, both conical reservoirs function to concentrate the gas which is generated in the sludge mixture 13 which is contained within the walls of the sewage tank 14. The sludge mixture 13 is comprised of household sewage, water, and a variety of anaerobic bacteria. From the sludge mixture 13 is generated a pocket of gas 15, which consists of hydrogen and methane. Carbon dioxide may be contained in variable amounts, depending on the extent of the oxygenation of the sludge. As the gas 15 collects in cone 12, the sludge-water mixture is displaced downward. The effect is to pressurize the gas and this simplifys the mechanics of inducing flow. Gas 15 flows into the float valve section 16 which functions to prevent the flow of the liquid mixture 13 into the upper transport tubing 17, which passes the bend 18 then is connected to the condensation drain 19 from which condensed liquid can be drained by the stop-cock 20. Further tubing carries the gas to the purification filter 21 which is filled with a filtering medium such as activated charcoal. Connection is made to the domestic gas line 22 at terminal fixture 23. The flow of the domestic gas creates a vacuum which draws the gas 15 into the domestic gas line 22 and is available to be used at fuel consumption point 24.

The entire gas collection reservoir is anchored into the sewage tank 14 by means of the adjustable support rods 25, 26, and 27 which are expandable to fit the size of the average tank.

Figure 3:
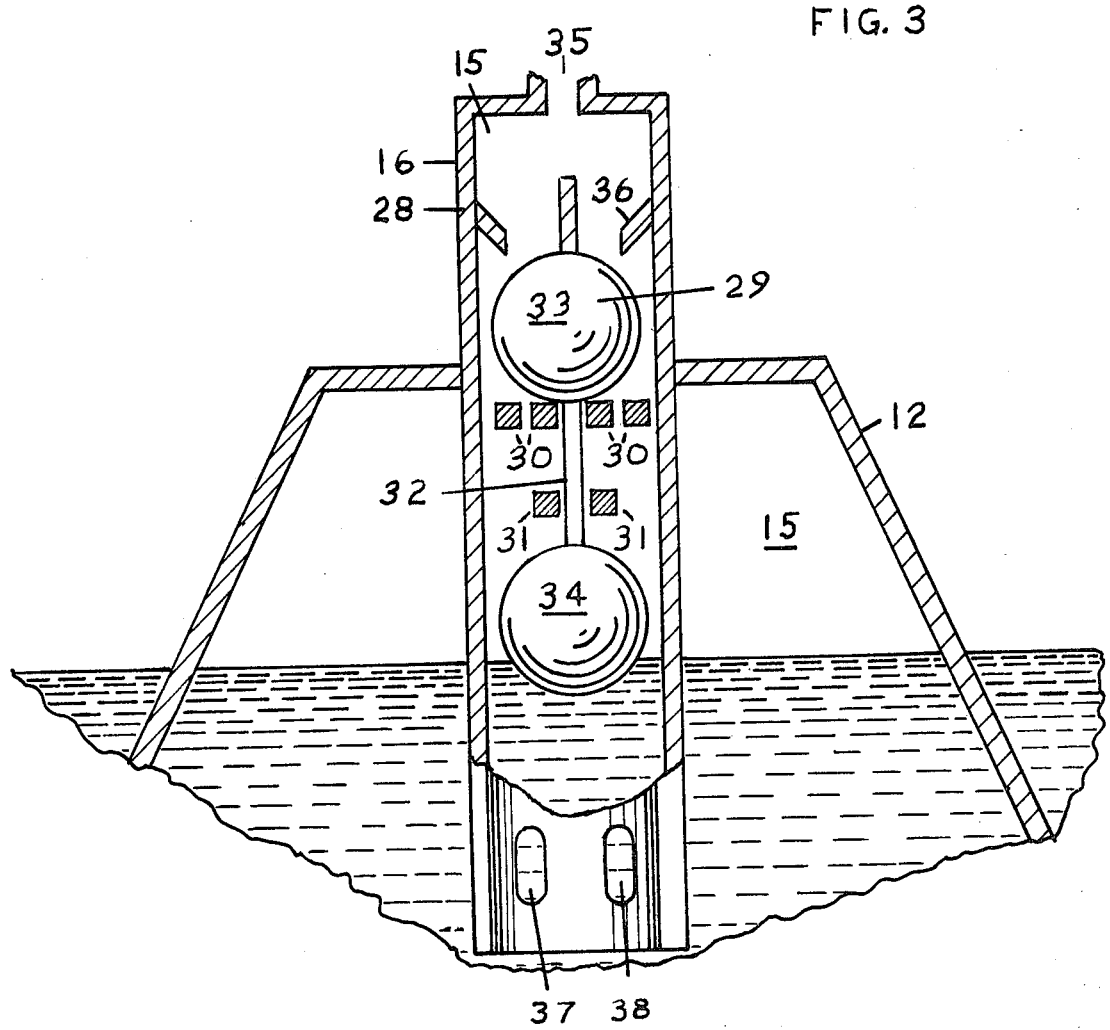
FIG. 3 is a vertical sectional view of the valve which prevents liquid flow into the tube connection.

FIG. 3 shows the float valve section 16 which is comprised of the cylindrical case 28 and contains the double spheroid float 29 which is supported between the walls of the case 28 and rests upon supports 30. The lower supports 31 stabilize the connecting rod 32, which joins the upper sphere 33 to the lower sphere 34. As the gas 15 is drawn through the top part 35, the liquid 13 rises and this causes the lower sphere 34 to rise within the cylindrical case 28 and the connecting rod 32 forces the upper sphere 33 to rise. If it rises far enough it comes to rest upon the valve seal 36 which seals the chamber and prevents the further flow of gas and/or liquid through the top port 35. Obviously, the lower sphere 34 will not rise unless sufficient gas is drained from the smaller conical reservoir 12, and this only occurs when the entire reservoir is depleted. The sealing of upper sphere 33 against the valve seal 36 occurs only when total reliance must be made upon the external household gas supply.

Vents 37 and 38 are provided in the cylindrical case 28 to facilitate liquid flow.

Figure 4:
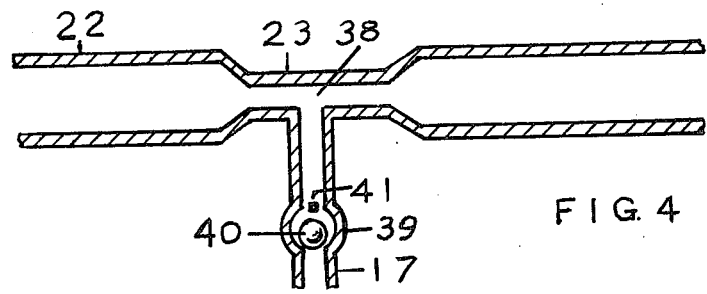
FIG. 4 is a horizontal sectional view of the tube connection from the reservoir into the household gas line. Included is a one way valve.

FIG. 4, shows Terminal fixture 23 where transport tubing 17 connects with the domestic gas line 22. The gas which flows through line 22 is forced to flow at a greater velocity when the tubing narrows at point 38 thereby creating a vacuum at that point 38 and causing a gas flow from transport tube 17 into gas line 22. The two gases mix at point 38 and flow to fuel consumption point 24 (FIG. 1). The vacuum at point 38 will draw gas from transport tubing 17 into the gas line 22 even if there is no pressure exerted from the compressed gas 15 within the conical reservoir 12. If there is pressure in said conical reservoir, gas will flow without the need of said vacuum.

One way valve 39 is necessary in the event a vacuum is created within conical reservoir 12 or when the fuel consumption point 24 is shut off through normal use of an on-off valve and the normal pressure of gas line 22 will be forced into the system where it may back up into the cylindrical reservoir 10 and eventually overflow into the sewage tank 14 and be lost. Excessive pressure at point 38 will cause sphere 40 to wedge in the lower opening thereby blocking any back flow into transport line 17. Means 41, is provided to allow gas flow past that point, but not the loss of sphere 40.

Thusly, combustible gas is produced within the sludge mixture 13 and is trapped by the cylindrical reservoir 10 and ultimately passes through float valve section 16, condensation drain 19, and purification filter 21, before the pressure of the gas, or the vacuum at joint 23 causes it to flow into a standard household gas line 22 to be used as a mixture with domestic gas supplies.

Having thus described the invention, it is to be understood that certain modifications in the construction and arrangement of the parts will be made, as deemed necessary, without departing from the scope of the appended claims.

I claim the following:

1. A sewage gas collection reservoir comprising:
   a. a gas collecting reservoir capable of being contained within the walls of a sewage tank,
   b. support rods connected to said gas collecting reservoir, anchoring said reservoir in a sewage containing tank,
   c. said reservoir containing a top port, the opening of said top port which is regulated by a float valve which is capable of preventing the sewage level from passing through said top port,
   d. gas transport tubing connecting said top port to a terminal fixture, at said terminal fixture, where gas which is received from said tubing is capable of being fed into a gas line,
   e. said tubing containing a one-way valve which is capable of preventing the back flow of gas into said reservoir.

2. A sewage gas collection reservoir as defined in claim 1 wherein said float valve comprises a cylindrical case containing a double spheroid float, said float comprised of a lower sphere which rises with a rise of the liquid, connected to an upper sphere which is capable of being forced to rest against a valve seal and is capable of preventing the flow of gas past said valve seal.

3. A sewage gas collection reservoir as defined in claim 1 wherein said terminal fixture comprises a gas line which narrows at its connection with said transport tubing to cause a gas flow at said connection from said transport tubing into said gas line.

* * * * *